Nov. 18, 1952     T. W. KEARINS     2,618,048

TOOLHOLDER

Filed April 3, 1950

Inventor
THEODORE W. KEARINS

BY Lawler + Lawler

Attorneys.

Patented Nov. 18, 1952

2,618,048

UNITED STATES PATENT OFFICE 2,618,048

TOOLHOLDER

Theodore W. Kearins, Cleveland, Ohio

Application April 3, 1950, Serial No. 153,716

2 Claims. (Cl. 29—96)

The object of the invention is to provide a means adaptable to be mounted in a standard tool holder for a lathe whereby the side clearance of a preground cutter bit is established with ease and despatch.

The invention and its aims and objects will be readily understood from the following description taken in connection with the accompanying drawing of one embodiment of the invention herein given for illustrative purposes, the true scope of the invention being more particularly pointed out in the appended claims.

Similar numerals refer to similar parts throughout the several views.

Figure 1:
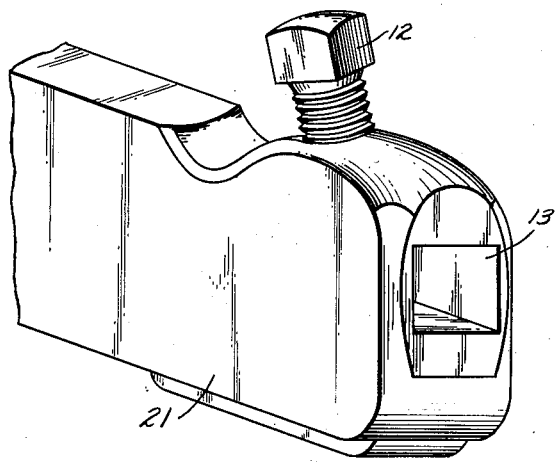
Figure 1 is a fragmentary perspective of a conventional lathe tool holder.

A tool holder in accordance with the present invention is made of a wedge shaped strip of metal 1 having a side 2 forming a right angle with the base 3, an inclined face 4 at an arcuate angle to the base, and truncated as at 5. Within the length of the wedge shaped strip there is provided a notch 6 for the reception of the bridging strip 7, so that when it is soldered or brazed therein it is flush with the base 3 of the wedge.

The bridging strip is made of strip spring steel and it extends laterally from the inclined face of the wedge, it is then bent upwardly in such a fashion that the surface adjacent its extremity 8 is soldered or brazed in the recess 9 provided therefor in the semicylindrical member 10. The bridging member is adapted to hold the wedge shaped member and semicylindrical member in assembled relationship.

It will be noted that the recess 9 in the semicylindrical member is not a circular arc, but consists of a number of plane faces 11, 11 and 11, and that they are free from contact with that portion of the bridging strip that circumscribes them, the object being to give the semi-cylindrical member adaptive freedom to engage the face of the cutter bit when it is inserted in the tool holder mounted in the tool holder 21 and the set screw 12 therein is tightened against the cutter bit to hold the assembly in operative position therein.

It will be further noted that the semicylindrical member engages the wall of the aperture 13 in the tool holder tangentially as at 14 and 15 which permits it to slightly rotate in adjusting its face 16 in proper contactual relationship with the face 16 of the cutter bit 17.

Figure 2:
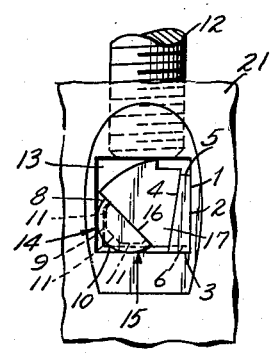
Figure 2 is a fragmentary end view of a lathe tool holder with cutter bit and adapter mounted therein.
Figure 3:
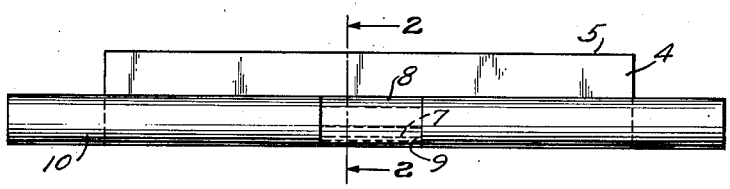
Figure 3 is a longitudinal view of the adapter.
Figure 4:
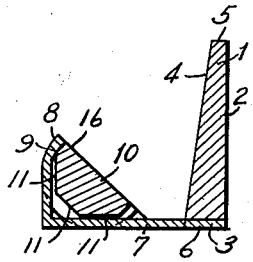
Figure 4 is a sectional view taken on line 2—2 in Fig. 3.
Figure 5:
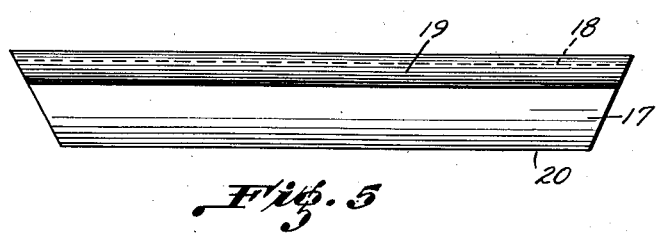
Figure 5 is a longitudinal view of the cutter bit.
Figure 6:
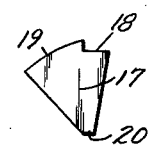
Figure 6 is an end view of the cutter bit.

The cutter bit is of a triangular configuration as shown in Figures 2 and 6 and is provided with a chip breaker 18 extending the entire length thereof. It is also provided with a convex face 19 and a blunt corner 20.

Tool holders in the art are made in different types to meet the demands of use, for instance, a straight tool holder, a right hand tool holder, and a left hand tool holder. The various types are provided with apertures of rectangular configuration positioned and conforming to well known standards in the art so that the adapter can be employed in them without inconvenience.

The tool holders are made with wedges tapering from 2° to 15° so that the desired side clearance is established by selecting the proper tool holder for the metal being machined, hence the grinding of side clearance on the tool bit is eliminated.

The cutting bit is one of the most important things to consider in the machining of the various metals in the lathe. It is well understood in the art that to machine metal accurately and efficiently it is important that the cutter bit have a keen cutting edge, ground with correct clearance, rake etc., for the particular kind of metal being machined, because it will produce better results, last longer and cut more freely than one improperly ground.

The inherent characteristics of the tool holder reduces the possibility of errors in grinding the side clearance, because the tool holder establishes the side clearance when a cutter bit of the type described is mounted therein in the tool holder in which it is mounted.

It is believed that the operation of the tool holder as a whole will be clear, in view of the foregoing description which has been given in connection with that of the construction.

It will accordingly be seen that I have provided construction which satisfies the objects of the invention, and while I have shown the invention in a certain physical embodiment, it is to be understood that modifications of structure may be made by those skilled in the art without departing from the invention as expressed in the following claims.

What is claimed is:

1. A tool holder, comprising in combination, a shank provided with a cutter receiving passageway of rectangular configuration, an adapter removably mounted in the receiving passageway and forming substantially a V-shaped passageway therein to receive a cutter bit of triangular configuration, the adapter comprising a truncated member of wedge-shaped configuration having a right-angled corner adapted to engage confronting faces of the rectangular passageway, a semicylindrical member mounted in the rectangular passageway and tangentially engaging the opposite corner of the passageway from that of the wedge-shaped member, a resilient bridging strip mounted in a notch within the length of the wedge-shaped member and the semicylindrical member and adapted to connect and position the aforementioned members in assembled relationship, the inclined face of the wedge-shaped member and the semicylindrical member adapted to position the triangular cutter bit in the adapter, and a set screw in the tool holder adapted to force the cutter bit seated in the adapter downward into rigid engagement with the inclined walls of the adapter and thus hold the cutter bit against movement therein and the adapter against movement in the rectangular passageway in the tool holder.

2. A tool holder, comprising, in combination, a shank provided with a cutter receiving passageway of rectangular configuration, an adapter removably mounted in the rectangular passageway and forming substantially a V-shaped passageway therein to receive a cutter bit of triangular configuration, the adapter comprising a member of wedge-shaped configuration having a right-angled corner adapted to engage confronting faces of the rectangular passageway, a semicylindrical member mounted in the rectangular passageway and tangentially engaging the opposite corner of the passageway from that of the wedge-shaped member, a resilient bridging strip connecting member within the length of the wedge-shaped member and the semicylindrical member and adapted to connect the aforementioned members in assembled relationship, and which permits slight rotative movement of the semicylindrical member independently of the wedge-shaped member so that the proper inclination of the flat wall of the semicylindrical member will adjust itself with the engaging face of the cutter bit when forced into compressive engagement therewith by tightening a set screw in the tool holder.

THEODORE W. KEARINS.

REFERENCES CITED

The following references are of record in the file of this patent:

UNITED STATES PATENTS

| Number | Name | Date |
|---|---|---|
| 2,314,665 | Specht | Mar. 23, 1943 |
| 2,347,136 | Speckert | Apr. 18, 1944 |

FOREIGN PATENTS

| Number | Country | Date |
|---|---|---|
| 20,865 | France | Apr. 3, 1919 |